(12) United States Patent
Deshpande et al.

(10) Patent No.: US 12,170,760 B2
(45) Date of Patent: Dec. 17, 2024

(54) DEVICE FOR DECODING A VIDEO BITSTREAM

(71) Applicant: Velos Media, LLC, Dallas, TX (US)

(72) Inventors: Sachin G. Deshpande, Camas, WA (US); Christopher A. Segall, Camas, WA (US)

(73) Assignee: Velos Media, LLC, Dallas, TX (US)

( * ) Notice: Subject to any disclaimer, the term of this patent is extended or adjusted under 35 U.S.C. 154(b) by 3 days.

(21) Appl. No.: 18/109,253

(22) Filed: Feb. 13, 2023

(65) Prior Publication Data

US 2023/0199172 A1    Jun. 22, 2023

Related U.S. Application Data

(63) Continuation of application No. 17/565,407, filed on Dec. 29, 2021, now Pat. No. 11,582,446, which is a
(Continued)

(51) Int. Cl.
| | |
|---|---|
| *H04N 19/105* | (2014.01) |
| *H04N 19/159* | (2014.01) |
| *H04N 19/172* | (2014.01) |
| *H04N 19/44* | (2014.01) |
| *H04N 19/46* | (2014.01) |
| *H04N 19/503* | (2014.01) |

(Continued)

(52) U.S. Cl.
CPC ......... *H04N 19/105* (2014.11); *H04N 19/159* (2014.11); *H04N 19/172* (2014.11); *H04N 19/44* (2014.11); *H04N 19/46* (2014.11); *H04N 19/503* (2014.11); *H04N 19/573* (2014.11); *H04N 19/577* (2014.11); *H04N 19/58* (2014.11); *H04N 19/70* (2014.11)

(58) Field of Classification Search
None
See application file for complete search history.

(56) References Cited

U.S. PATENT DOCUMENTS

| | | |
|---|---|---|
| 6,887,384 B1 | 5/2005 | Frechet et al. |
| 7,471,726 B2 | 12/2008 | Srinivasan |

(Continued)

FOREIGN PATENT DOCUMENTS

| | | |
|---|---|---|
| EP | 1450565 B1 | 1/2009 |
| WO | 2013054951 A1 | 4/2013 |
| WO | 2013082464 A1 | 6/2013 |

OTHER PUBLICATIONS

Boyce, Jet, et al., "BoG report on reference picture buffering and list construction", Joint Collaborative Team on Video Coding (JCT-VC) of ITU-T SG16 WP3 and ISO/IET JTC1/SC29/WG11 JCTVC-G1002, Nov. 21-30, 2011, 7th Meeting: Geneva, CH.

(Continued)

*Primary Examiner* — Talha M Nawaz
(74) *Attorney, Agent, or Firm* — Conley Rose, P.C.

(57) ABSTRACT

A system for decoding a video bitstream includes receiving a reference picture set associated with a frame including a set of reference picture identifiers. The reference picture set identifies one or more reference pictures to be used for inter-prediction of the frame based upon its associated least significant bits of a picture order count based upon the reference picture identifiers. The one or more reference pictures is a second or greater previous frame to the frame having the matching reference picture identifier.

17 Claims, 16 Drawing Sheets

Related U.S. Application Data continuation of application No. 17/164,757, filed on Feb. 1, 2021, now Pat. No. 11,245,893, which is a continuation of application No. 16/706,783, filed on Dec. 8, 2019, now Pat. No. 10,911,752, which is a continuation of application No. 16/274,175, filed on Feb. 12, 2019, now Pat. No. 10,506,227, which is a continuation of application No. 15/645,797, filed on Jul. 10, 2017, now Pat. No. 10,250,875, which is a continuation of application No. 15/388,798, filed on Dec. 22, 2016, now Pat. No. 9,883,181, which is a continuation of application No. 14/656,161, filed on Mar. 12, 2015, now abandoned, which is a continuation of application No. 13/358,414, filed on Jan. 25, 2012, now abandoned.

(51) Int. Cl.
*H04N 19/573* (2014.01)
*H04N 19/577* (2014.01)
*H04N 19/58* (2014.01)
*H04N 19/70* (2014.01)

(56) References Cited

U.S. PATENT DOCUMENTS

| | | | |
|---|---|---|---|
| 7,609,897 | B2 | 10/2009 | Oneda et al. |
| 8,165,204 | B2 | 4/2012 | Bronstein et al. |
| 9,743,061 | B2 | 8/2017 | Choi et al. |
| 9,918,080 | B2 | 3/2018 | Hannuksela et al. |
| 2004/0151243 | A1 | 8/2004 | Bhaskaran et al. |
| 2005/0084007 | A1 | 4/2005 | Lightstone et al. |
| 2007/0217704 | A1* | 9/2007 | Zeng ............ H04N 19/91 375/E7.199 |
| 2008/0117985 | A1* | 5/2008 | Chen ............ H04N 19/46 375/E7.2 |
| 2009/0213938 | A1 | 8/2009 | Lee et al. |
| 2010/0220788 | A1 | 9/2010 | Wittmann et al. |
| 2011/0122942 | A1 | 5/2011 | Kudana et al. |
| 2012/0027089 | A1 | 2/2012 | Chien et al. |
| 2012/0082210 | A1 | 4/2012 | Chien et al. |
| 2012/0106624 | A1* | 5/2012 | Huang ............ H04N 19/86 375/E7.126 |
| 2012/0134411 | A1 | 5/2012 | Nishi |
| 2012/0189053 | A1 | 7/2012 | Chen et al. |
| 2012/0233405 | A1 | 9/2012 | Budagavi |
| 2012/0269275 | A1* | 10/2012 | Hannuksela ............ H04N 19/34 375/E7.026 |
| 2013/0058405 | A1 | 3/2013 | Zhao et al. |
| 2013/0077681 | A1* | 3/2013 | Chen ............ H04N 7/12 375/240.12 |
| 2013/0089152 | A1* | 4/2013 | Wang ............ H04N 19/187 375/240.23 |
| 2013/0114742 | A1 | 5/2013 | Hannuksela et al. |
| 2013/0142257 | A1* | 6/2013 | Wang ............ H04N 19/172 375/240.12 |
| 2013/0329787 | A1 | 12/2013 | Ramasubramonian et al. |
| 2014/0003537 | A1 | 1/2014 | Ramasubramonian et al. |
| 2014/0003538 | A1 | 1/2014 | Ramasubramonian et al. |
| 2014/0151243 | A1 | 6/2014 | Chatelier et al. |
| 2014/0301473 | A1 | 10/2014 | Park et al. |
| 2015/0195577 | A1 | 7/2015 | Hannuksela |
| 2019/0045206 | A1 | 2/2019 | Keinert et al. |
| 2020/0053389 | A1 | 2/2020 | Jeon et al. |

OTHER PUBLICATIONS

Bross, et al., "High Efficiency Video Coding", Joint Collaborative Team on Video Coding (JCT-VC_ of ITU-T SG16 WP3 and ISO/IEC JTC1/SC29/WG11 JCTVC-G1103_d6, Jan. 19, 2012, 13 pages.

Deshpande, et al., "AHG21: Comments on Signaling of Reference Pictures," Joint Collaborative Team on Video Coding (JCT-VC) of ITU-T SG16 WP3 and ISO/IEC JTC1/SC29/WG11 JCTVC-H0531, Feb. 7, 2012, 5 pages.

Misra, Kiran, et al., "Long term picture referencing using wrapped POC," Document: JCTVC-G713, 7th Meeting: Geneva, CH, Nov. 21-30, 2011, 5 pages.

Wiegand, et al., "WD1: Working draft 1 of High-Efficiency Video Coding," JCT-VC of ITU-T SG16 WP3 and ISO/IEC JTC1/SC29/WG11, 3rd Meeting: Guangzhou, CN, Oct. 7-15, 2010.

Wahadaniah, Viktor, "AHG21: Construction and modification of predefined referenced picture sets and reference picturesets," Document JCTVC-G548, 7th Meeting: Geneva, CH, Nov. 21-30, 2011. 21 pages.

\* cited by examiner

DEVICE FOR DECODING A VIDEO BITSTREAM

CROSS-REFERENCE TO RELATED APPLICATIONS

This application is a continuation of U.S. application Ser. No. 17/565,407 filed Dec. 29, 2021, which is a continuation of U.S. application Ser. No. 17/164,757 filed Feb. 1, 2021, now U.S. Pat. No. 11,245,893, which is a continuation of U.S. application Ser. No. 16/706,783 filed Dec. 8, 2019, now U.S. Pat. No. 10,911,752, which is a continuation of Ser. No. 16/274,175 filed Feb. 12, 2019, now U.S. Pat. No. 10,506,227, which is a continuation of U.S. application Ser. No. 15/645,797 filed Jul. 10, 2017, now U.S. Pat. No. 10,250,875, which is a continuation of U.S. application Ser. No. 15/388,798 filed Dec. 22, 2016, now U.S. Pat. No. 9,883,181, which is a continuation of U.S. application Ser. No. 14/656,161 filed on Mar. 12, 2015, now abandoned, which is a continuation of U.S. application Ser. No. 13/358,414 filed on Jan. 25, 2012, now abandoned, the entire contents of all the applications are hereby incorporated by reference and for which priority is claimed under 35 U.S.C. Section 120.

BACKGROUND OF THE INVENTION

The present invention relates to video encoding and/or decoding.

Digital video is typically represented as a series of images or frames, each of which contains an array of pixels. Each pixel includes information, such as intensity and/or color information. In many cases, each pixel is represented as a set of three colors, each of which may be defined by eight bit color values.

Video-coding techniques, for example H.264/MPEG-4 AVC (H.264/AVC), typically provide higher coding efficiency at the expense of increasing complexity. Increasing image quality requirements and increasing image resolution requirements for video coding techniques also increase the coding complexity. Video decoders that are suitable for parallel decoding may improve the speed of the decoding process and reduce memory requirements; video encoders that are suitable for parallel encoding may improve the speed of the encoding process and reduce memory requirements.

H.264/MPEG-4 AVC [Joint Video Team of ITU-T VCEG and ISO/IEC MPEG, "H.264: Advanced video coding for generic audiovisual services," ITU-T Rec. H.264 and ISO/IEC 14496-10 (MPEG4—Part 10), November 2007], and similarly the JCT-VC, ["Draft Test Model Under Consideration", JCTVC-A205, JCT-VC Meeting, Dresden, April 2010 (JCT-VC)], both of which are incorporated by reference herein in their entirety, are video codec (encoder/decoder) specifications that decode pictures based upon reference pictures in a video sequence for compression efficiency.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

While any video coder/decoder (codec) that uses encoding/decoding may be accommodated by embodiments described herein, exemplary embodiments are described in relation to an H.264/AVC encoder and an H.264/AVC decoder merely for purposes of illustration. Many video coding techniques are based on a block-based hybrid video-coding approach, wherein the source-coding technique is a hybrid of inter-picture, also considered inter-frame, prediction, intra-picture, also considered intra-frame, prediction and transform coding of a prediction residual. Inter-frame prediction may exploit temporal redundancies, and intra-frame and transform coding of the prediction residual may exploit spatial redundancies.

Figure 1:
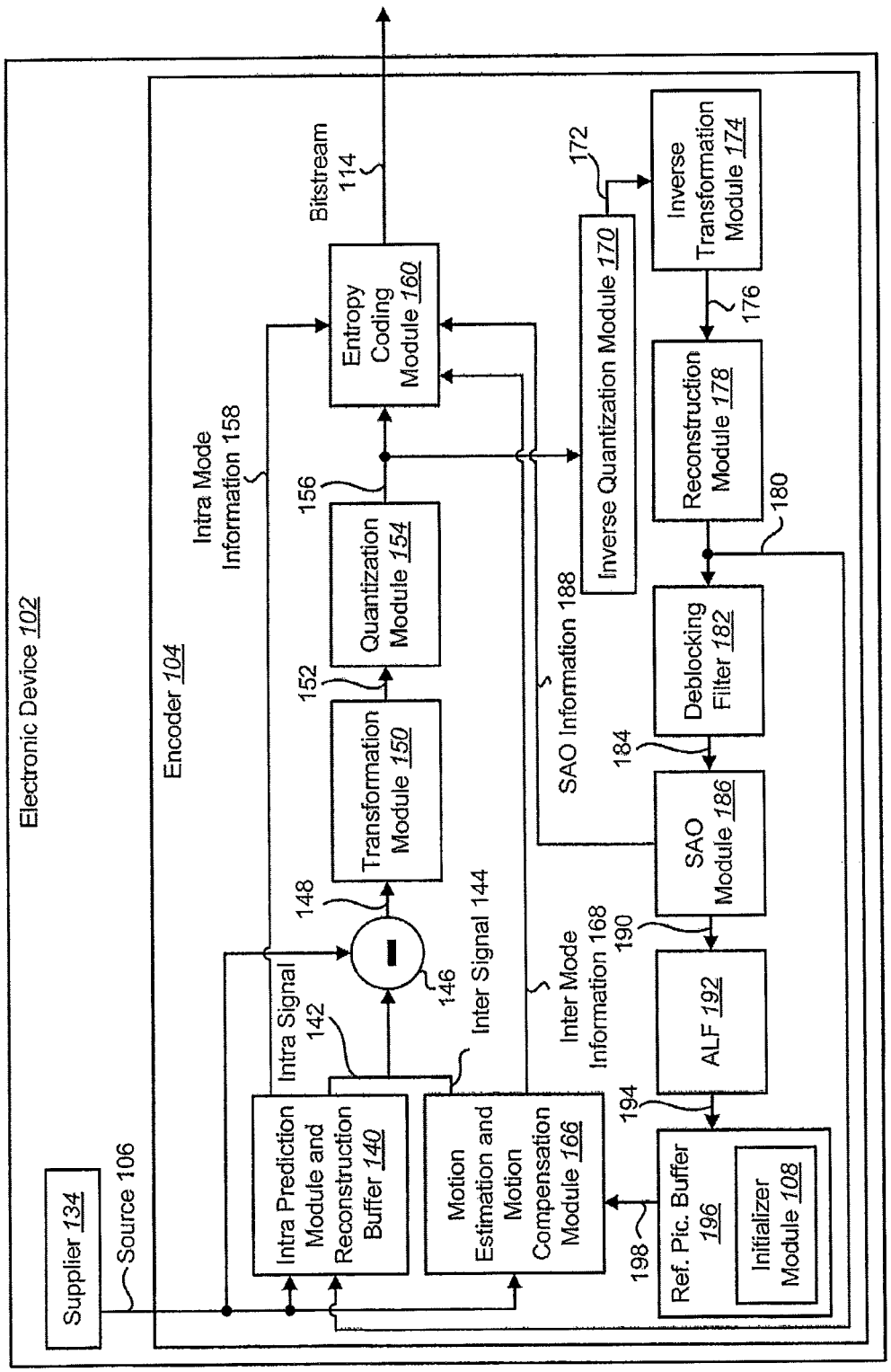
FIG. 1 illustrates a H.264/AVC video encoder.

FIG. 1 is a block diagram illustrating an exemplary encoder 104 for an electronic device 102. It should be noted that one or more of the elements illustrated as included within the electronic device 102 may be implemented in hardware, and/or software. For example, the electronic device 102 includes an encoder 104, which may be implemented in hardware and/or software.

The electronic device 102 may include a supplier 134. The supplier 134 may provide picture or image data (e.g., video) as a source 106 to the encoder 104. Non limiting examples of the supplier 134 include image sensors, memory, communication interfaces, network interfaces, wireless receivers, ports, video frame content, previously encoded video content, non-encoded video content, etc.

The source 106 may be provided to an intra-frame prediction module and reconstruction buffer 140. The source 106 may also be provided to a motion estimation and motion compensation module 166 and to a subtraction module 146.

The intra-frame prediction module and reconstruction buffer 140 may generate intra mode information 148 and an intra signal 142 based on the source 106 and reconstructed data 180. The motion estimation and motion compensation module 166 may generate inter mode information 168 and an inter signal 144 based on the source 106 and a reference picture buffer 196 signal 198.

The reference picture buffer 196 signal 198 may include data from one or more reference pictures stored in the reference picture buffer 196. The reference picture buffer 196 may also include an RPS index initializer module 108. The initializer module 108 may process reference pictures corresponding to the buffering and list construction of an RPS.

The encoder 104 may select between the intra signal 142 and the inter signal 144 in accordance with a mode. The intra signal 142 may be used in order to exploit spatial characteristics within a picture in an intra coding mode. The inter signal 144 may be used in order to exploit temporal characteristics between pictures in an inter coding mode. While in the intra coding mode, the intra signal 142 may be provided to the subtraction module 146 and the intra mode information 158 may be provided to an entropy coding module 160. While in the inter coding mode, the inter signal 144 may be provided to the subtraction module 146 and the inter mode information 168 may be provided to the entropy coding module 160.

Either the intra signal 142 or the inter signal 144 (depending on the mode) is subtracted from the source 106 at the subtraction module 146 in order to produce a prediction residual 148. The prediction residual 148 is provided to a transformation module 150. The transformation module 150 may compress the prediction residual 148 to produce a transformed signal 152 that is provided to a quantization module 154. The quantization module 154 quantizes the transformed signal 152 to produce transformed and quantized coefficients (TQCs) 156.

The TQCs 156 are provided to an entropy coding module 160 and an inverse quantization module 170. The inverse quantization module 170 performs inverse quantization on the TQCs 156 to produce an inverse quantized signal 172 that is provided to an inverse transformation module 174. The inverse transformation module 174 decompresses the inverse quantized signal 172 to produce a decompressed signal 176 that is provided to a reconstruction module 178.

The reconstruction module 178 may produce reconstructed data 180 based on the decompressed signal 176. For example, the reconstruction module 178 may reconstruct (modified) pictures. The reconstructed data 180 may be provided to a deblocking filter 182 and to the intra prediction module and reconstruction buffer 140. The deblocking filter 182 may produce a filtered signal 184 based on the reconstructed data 180.

The filtered signal 184 may be provided to a sample adaptive offset (SAO) module 186. The SAO module 186 may produce SAO information 188 that is provided to the entropy coding module 160 and an SAO signal 190 that is provided to an adaptive loop filter (ALF) 192. The ALF 192 produces an ALF signal 194 that is provided to the reference picture buffer 196. The ALF signal 194 may include data from one or more pictures that may be used as reference pictures.

The entropy coding module 160 may code the TQCs 156 to produce a bitstream 114. Also, the entropy coding module 160 may code the TQCs 156 using Context-Adaptive Variable Length Coding (CAVLC) or Context-Adaptive Binary Arithmetic Coding (CABAC). In particular, the entropy coding module 160 may code the TQCs 156 based on one or more of intra mode information 158, inter mode information 168 and SAO information 188. The bitstream 114 may include coded picture data. The encoder often encodes a frame as a sequence of blocks, generally referred to as macroblocks.

Quantization, involved in video compression such as HEVC, is a lossy compression technique achieved by compressing a range of values to a single value. The quantization parameter (QP) is a predefined scaling parameter used to perform the quantization based on both the quality of reconstructed video and compression ratio. The block type is defined in HEVC to represent the characteristics of a given block based on the block size and its color information. QP, resolution information and block type may be determined before entropy coding. For example, the electronic device 102 (e.g., the encoder 104) may determine the QP, resolution information and block type, which may be provided to the entropy coding module 160.

The entropy coding module 160 may determine the block size based on a block of TQCs 156. For example, block size may be the number of TQCs 156 along one dimension of the block of TQCs. In other words, the number of TQCs 156 in the block of TQCs may be equal to block size squared. For instance, block size may be determined as the square root of the number of TQCs 156 in the block of TQCs. Resolution may be defined as a pixel width by a pixel height. Resolution information may include a number of pixels for the width of a picture, for the height of a picture or both. Block size may be defined as the number of TQCs 156 along one dimension of a 2D block of TQCs.

In some configurations, the bitstream 114 may be transmitted to another electronic device. For example, the bitstream 114 may be provided to a communication interface, network interface, wireless transmitter, port, etc. For instance, the bitstream 114 may be transmitted to another electronic device via LAN, the Internet, a cellular phone base station, etc. The bitstream 114 may additionally or alternatively be stored in memory on the electronic device 102 or other electronic device.

Figure 2:
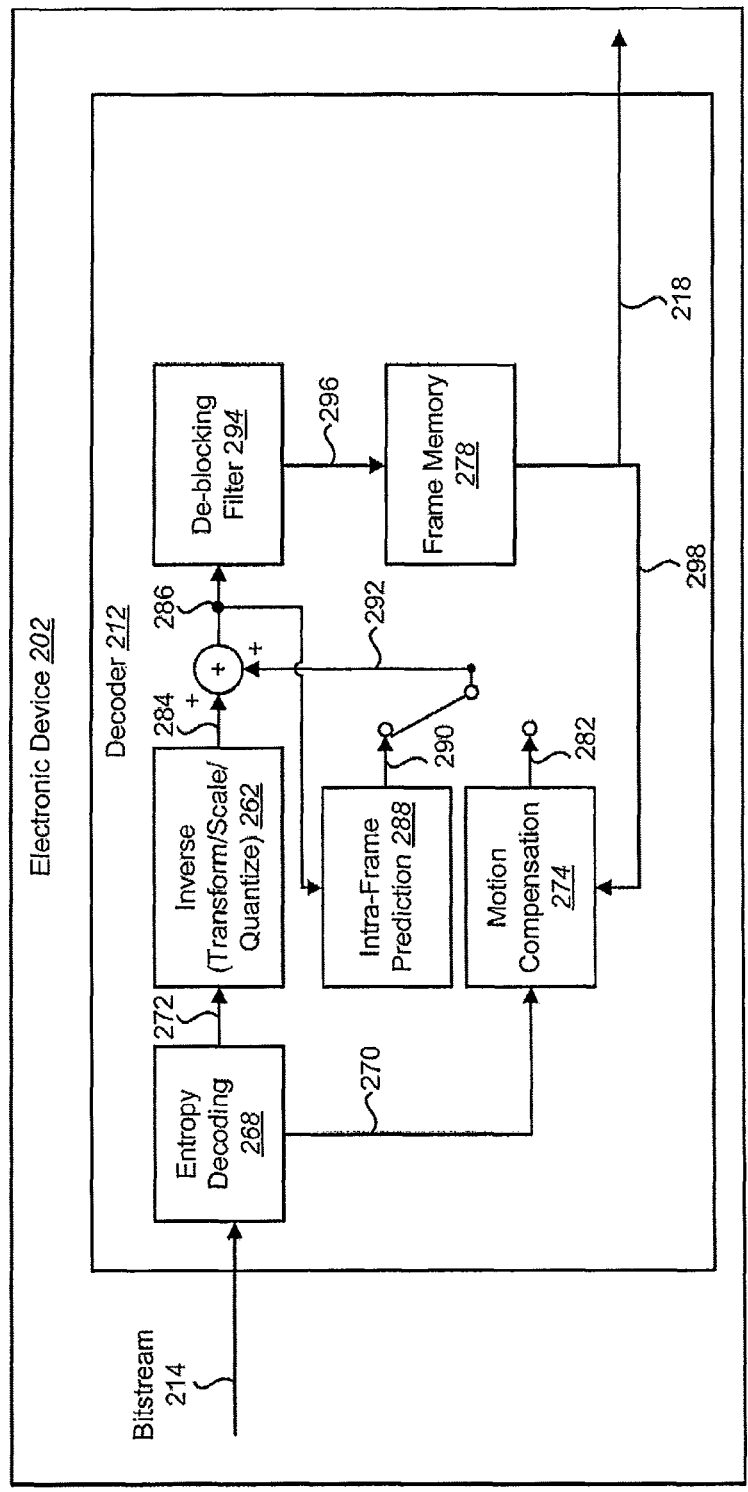
FIG. 2 illustrates a H.264/AVC video decoder.

FIG. 2 is a block diagram illustrating an exemplary decoder 212 on an electronic device 202. The decoder 212 may be included for an electronic device 202. For example, the decoder 212 may be a HEVC decoder. The decoder 212 and/or one or more of the elements illustrated as included in the decoder 212 may be implemented in hardware and/or software. The decoder 212 may receive a bitstream 214 (e.g., one or more encoded pictures included in the bitstream 214) for decoding. In some configurations, the received bitstream 214 may include received overhead information, such as a received slice header, received PPS (or picture parameter set), received buffer description information, etc. The encoded pictures included in the bitstream 214 may include one or more encoded reference pictures and/or one or more other encoded pictures.

Received symbols (in the one or more encoded pictures included in the bitstream 214) may be entropy decoded by an entropy decoding module 268, thereby producing a motion information signal 270 and quantized, scaled and/or transformed coefficients 272.

The motion information signal 270 may be combined with a portion of a reference frame signal 298 from a frame memory 278 at a motion compensation module 274, which may produce an inter-frame prediction signal 282. The quantized, descaled and/or transformed coefficients 272 may be inverse quantized, scaled and inverse transformed by an inverse module 262, thereby producing a decoded residual signal 284. The decoded residual signal 284 may be added to a prediction signal 292 to produce a combined signal 286. The prediction signal 292 may be a signal selected from either the inter-frame prediction signal 282 or an intra-frame prediction signal 290 produced by an intra-frame prediction module 288. In some configurations, this signal selection may be based on (e.g., controlled by) the bitstream 214.

The intra-frame prediction signal 290 may be predicted from previously decoded information from the combined signal 292 (in the current frame, for example). The combined signal 292 may also be filtered by a de-blocking filter 294. The resulting filtered signal 296 may be written to frame memory 278. The resulting filtered signal 296 may include a decoded picture.

The frame memory 778 may include a DPB (or display picture buffer) as described herein. The DPB may include one or more decoded pictures that may be maintained as short or long term reference frames. The frame memory 278 may also include overhead information corresponding to the decoded pictures. For example, the frame memory 278 may include slice headers, PPS information, buffer description information, etc. One or more of these pieces of information may be signaled from an encoder (e.g., encoder 104). The frame memory 278 may provide a decoded picture 718.

An input picture comprising a plurality of macroblocks may be partitioned into one or several slices. The values of the samples in the area of the picture that a slice represents may be properly decoded without the use of data from other slices provided that the reference pictures used at the encoder and the decoder are the same and that de-blocking filtering does not use information across slice boundaries. Therefore, entropy decoding and macroblock reconstruction for a slice does not depend on other slices. In particular, the entropy coding state may be reset at the start of each slice. The data in other slices may be marked as unavailable when defining neighborhood availability for both entropy decoding and reconstruction. The slices may be entropy decoded and reconstructed in parallel. No intra prediction and motion-vector prediction is preferably allowed across the boundary of a slice. In contrast, de-blocking filtering may use information across slice boundaries.

Figure 3:
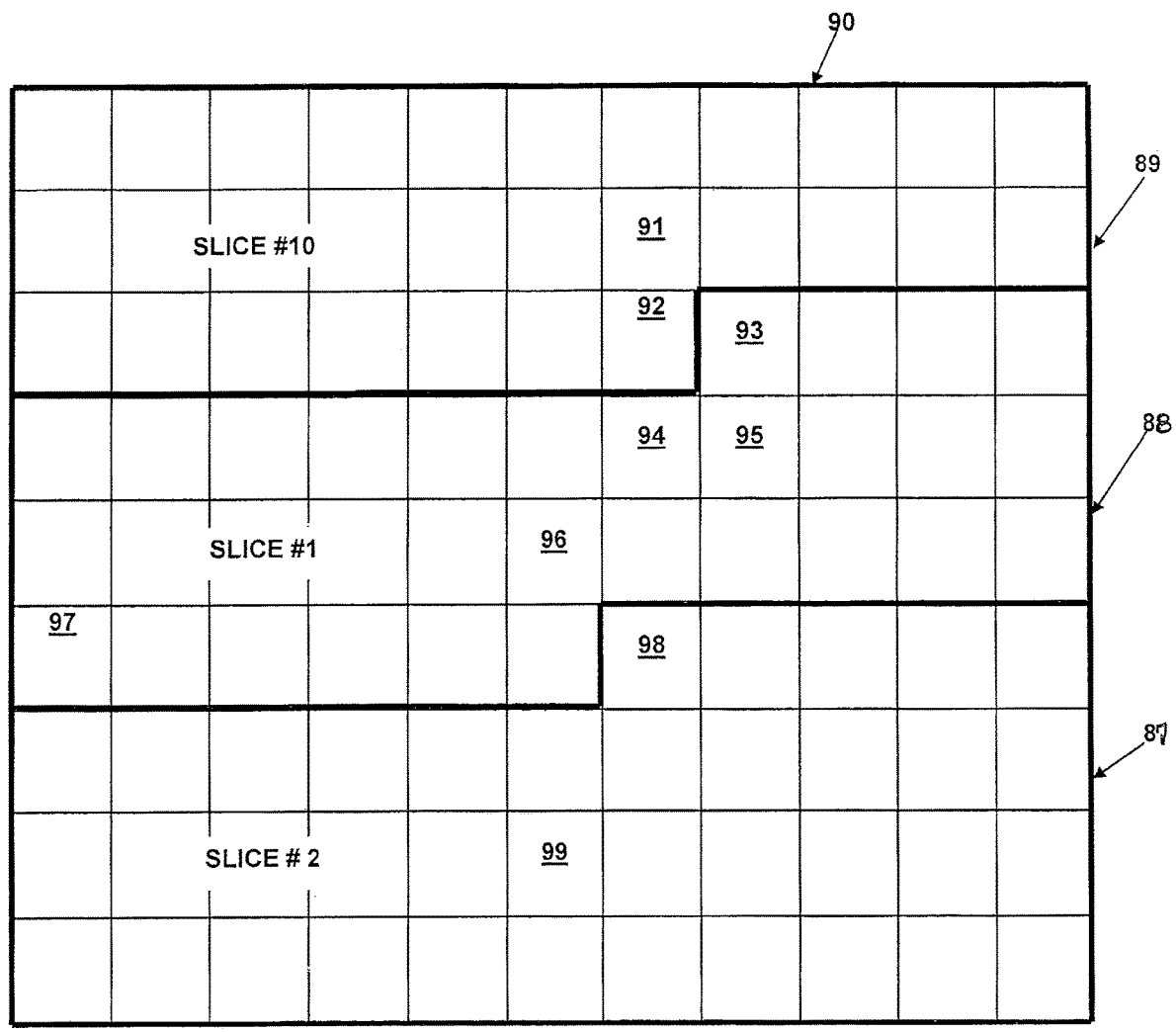
FIG. 3 illustrates an exemplary slice structure.

FIG. 3 illustrates an exemplary video picture 90 comprising eleven macroblocks in the horizontal direction and nine macroblocks in the vertical direction (nine exemplary macroblocks labeled 91-99). FIG. 3 illustrates three exemplary slices: a first slice denoted "SLICE #0" 89, a second slice denoted "SLICE #1" 88 and a third slice denoted "SLICE #2" 87. An H.264/AVC decoder may decode and reconstruct the three slices 87, 88, 89 in parallel. Each of the slices may be transmitted in scan line order in a sequential manner. At the beginning of the decoding/reconstruction process for each slice, entropy decoding 268 is initialized or reset and macroblocks in other slices are marked as unavailable for both entropy decoding and macroblock reconstruction. Thus, for a macroblock, for example, the macroblock labeled 93, in "SLICE #1," macroblocks (for example, macroblocks labeled 91 and 92) in "SLICE #0" may not be used for entropy decoding or reconstruction. Whereas, for a macroblock, for example, the macroblock labeled 95, in "SLICE #1," other macroblocks (for example, macroblocks labeled 93 and 94) in "SLICE #1" may be used for entropy decoding or reconstruction. Therefore, entropy decoding and macroblock reconstruction proceeds serially within a slice. Unless slices are defined using a flexible macroblock ordering (FMO), macroblocks within a slice are processed in the order of a raster scan.

Flexible macroblock ordering defines a slice group to modify how a picture is partitioned into slices. The macroblocks in a slice group are defined by a macroblock-to-slice-group map, which is signaled by the content of the picture parameter set and additional information in the slice headers. The macroblock-to-slice-group map consists of a slice-group identification number for each macroblock in the picture. The slice-group identification number specifies to which slice group the associated macroblock belongs. Each slice group may be partitioned into one or more slices, wherein a slice is a sequence of macroblocks within the same slice group that is processed in the order of a raster scan within the set of macroblocks of a particular slice group. Entropy decoding and macroblock reconstruction proceeds serially within a slice group.

Figure 4:
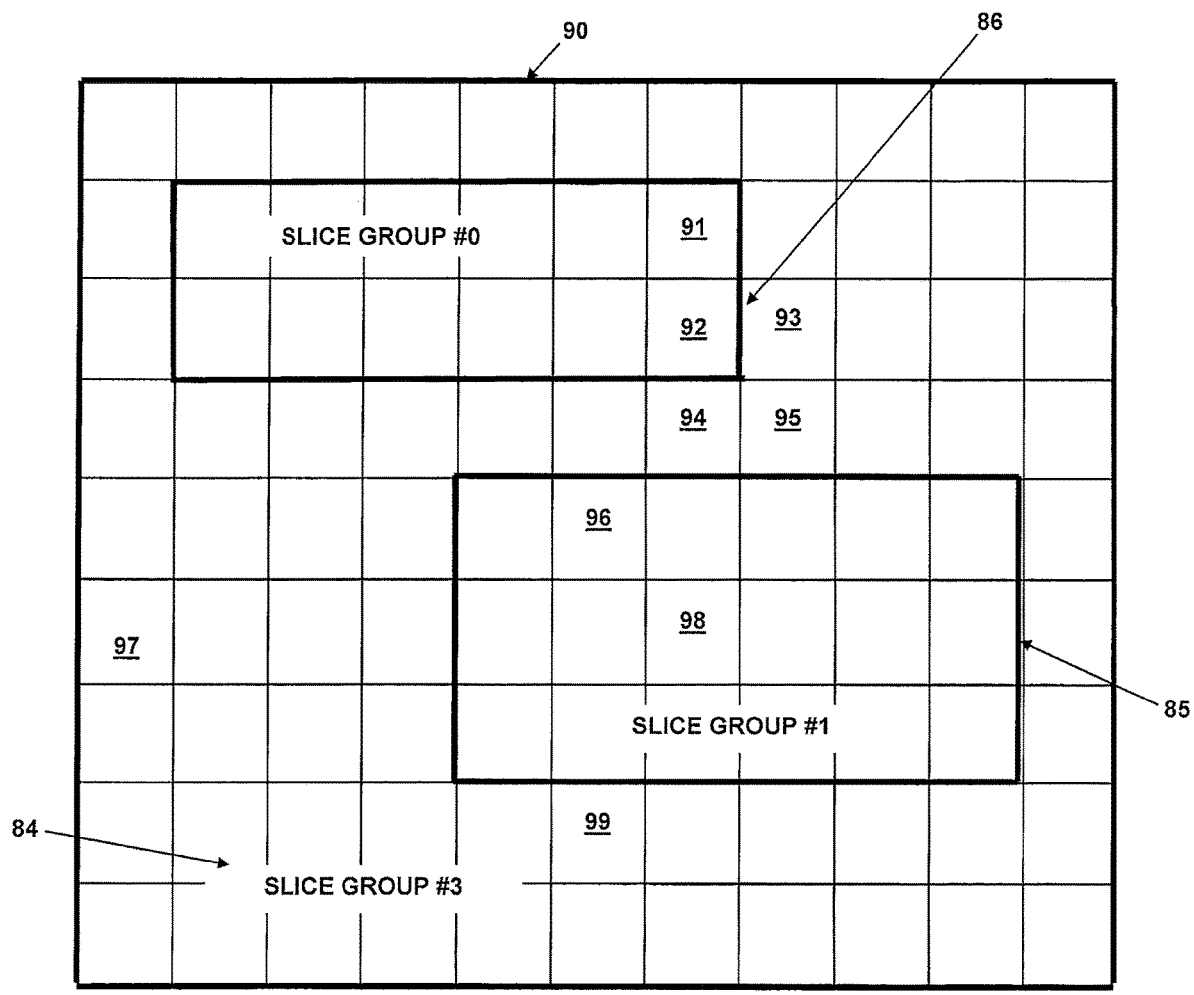
FIG. 4 illustrates another exemplary slice structure.

FIG. 4 depicts an exemplary macroblock allocation into three slice groups: a first slice group denoted "SLICE GROUP #0" 86, a second slice group denoted "SLICE GROUP #1" 85 and a third slice group denoted "SLICE GROUP #2" 84. These slice groups 84, 85, 86 may be associated with two foreground regions and a background region, respectively, in the picture 90.

A picture may be partitioned into one or more slices, wherein a slice may be self-contained in the respect that values of the samples in the area of the picture that the slice represents may be correctly reconstructed without use of data from other slices, provided that the references pictures used are identical at the encoder and the decoder. All reconstructed macroblocks within a slice may be available in the neighborhood definition for reconstruction.

A slice may be partitioned into more than one entropy slice, wherein an entropy slice may be self-contained in the respect that the area of the picture that the entropy slice represents may be correctly entropy decoded without the use of data from other entropy slices. The entropy decoding 268 may be reset at the decoding start of each entropy slice. The data in other entropy slices may be marked as unavailable when defining neighborhood availability for entropy decoding.

A device configured for decoding pictures obtains or otherwise receives a bitstream that includes a series of pictures, including a current picture. The device further obtains a reference picture set (RPS) parameter that may be used for the identification of other frames that may be used for the decoding of the current picture or for the decoding of pictures subsequent to the current picture in the order that pictures are signaled in the bitstream.

A RPS provides an identification of a set of reference pictures associated with the current frame. A RPS may identify reference pictures that are prior to the current picture in display order that may be used for inter prediction of the current picture and/or identify reference pictures that are after the current picture in display order that may be used for inter prediction of the current picture. For example, if the system receives frame 1, 3, 5 and 5 uses 3 for reference, and, an encoder uses frame 1 for the prediction of frame 7. Then, the RPS for 5 may signal to keep both frame 3 and 1 in the frame memory 278 even though frame 1 is not used for reference of frame 5. In one embodiment, the RPS for 5 may be [−2 −4]. Additionally, the frame memory 278 may be referred to the display picture buffer, or equivalently DPB. For this example, the frame number corresponds to the display order, or output order, of the frames.

A RPS describes one or more reference pictures that should be maintained, at least for a limited time duration, in the decoded picture buffer (DPB) for subsequent use. This identification of the RPS may be included in the slice header of each picture, together with a picture, and/or together with a group of pictures. In one embodiment, a list of RPS may be sent in a picture parameter set (PPS). Then, the slice header may identify one of the RPS sent in the PPS to be used for the slice. For example, a RPS for a group of pictures may be signaled in a picture parameter set (PPS). Any pictures in the DPB that are not a part of the RPS for the current frame may be marked as "unused for reference."

A DPB may be used to store reconstructed (e.g., decoded) pictures at the decoder. These stored pictures may then be used, for example, in an inter-prediction technique. Also, a picture in the DPB may be associated with a picture order count (POC). The POC may be a variable that is associated with each encoded picture and that has a value that increases with increasing picture position in an output order. In other words, the POC may be used by the decoder to deliver the pictures in the correct order for display. The POC may also be used for identification of reference pictures during construction of a reference picture list and identification of decoded reference pictures. Furthermore, the POC may be used for identification of pictures that are lost during transmission from an encoder to a decoder.

Figure 5:
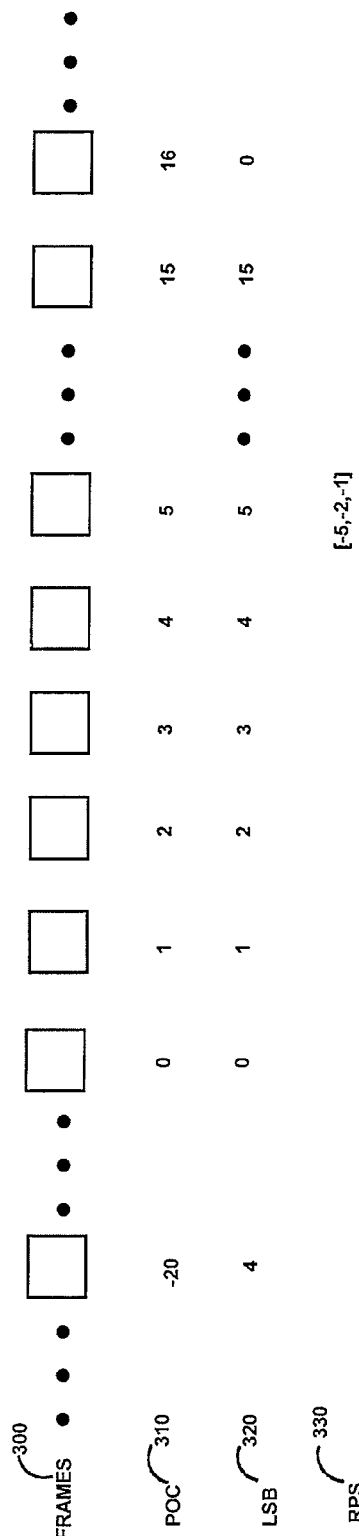
FIG. 5 illustrates reconstruction of an entropy slice.

Referring to FIG. 5, one example of a set of frames 300 provided from an encoder to a decoder is illustrated. Each of the frames may have an associated POC 310. As illustrated, the POC may increment from a minus number though a large positive number. In some embodiments, the POC may only increment from zero through a larger positive number. The POC is typically incremented by one for each frame, but in some cases one or more POC are skipped or otherwise omitted. For example, the POC for a set of frames in the encoder may be, 0, 1, 2, 3, 4, 5, etc. For example, the POC for the same or another set of frames in the encoder may be, 0, 1, 2, 4, 5, etc., with POC 3 being skipped or otherwise omitted.

As the POC becomes sufficiently large, a significant number of bits would be necessary to identify each frame using the POC. The encoder may reduce the number of bits used to identify a particular POC by using a selected number of least significant bits (LSB) of the POC to identify each frame, such as 4 bits. Since the reference frames used for decoding the current frame are often temporally located proximate to the current frame, this identification technique is suitable and results in a reduction in the computational complexity of the system and an overall reduction in the bit rate of the video. The number of LSB to use to identify the pictures may be signaled in the bit stream to the decoder.

As illustrated, with LSB being 4 bits, the LSB index repeats every 16 values (2 4) when the selected number of LSB of the POC is 4. Thus, frame 0 has a LSB having a value of 0, frame 1 has a LSB having a value of 1, . . . , frame 14 has a LSB having a value of 14, frame 15 has a LSB having a value of 15. However, frame 16 again has a LSB having a value of 0, frame 17 again has a LSB having a value of 1, and frame 20 has a LSB having a value of 4. The LSB identifier (generally also referred to as the LSB of the POC or, equivalently, POC LSB) may have the characteristic of LSB=POC % 16, where % is the remainder after dividing by 16 (2 number of least significant bits which in this case is 4). Similarly, if the selected number of LSBs to identify a POC is N bits, the LSB identifier may have the characteristic of LSB=POC % (2 N) where 2 N denotes 2 raised to the power of N. Rather than including the POC the bitstream to identify frames, the encoder preferably provides the LSB index (generally also referred to as the LSB of the POC or, equivalently, POC LSB), in the bitstream to the decoder.

The reference frames used for inter prediction of a current frame, or frames subsequent to the current frame, may be identified with an RPS using either relative (e.g., delta) referencing (using the difference between POC values, or alternatively a deltaPOC and a currentPOC, for example) or absolute referencing (using the POC, for example). In some embodiments, frames identified with relative referencing may be called a short term reference frame, and frames identified with an absolute referencing may be called a long term reference frame. For example, the frame identified by POC 5 310 and signaled to the decoder as LSB 5 320 in the bitstream may have an associated RPS 330 of [−5, −2, −1]. The meaning of the RPS values is described later.

Figure 6:
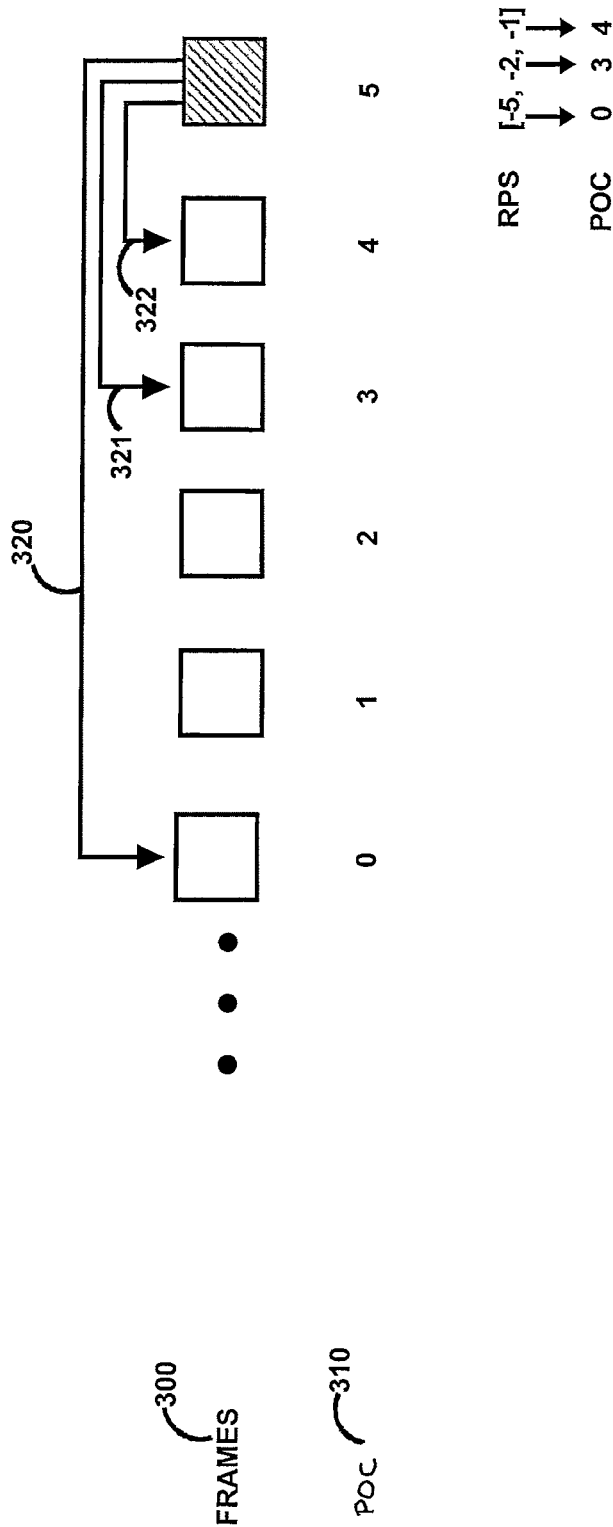
FIG. 6 illustrates reconstruction of a portion of the entropy slice of FIG. 5.

Referring to FIG. 6, illustrating a portion of FIG. 5, the RPS of [−5, −2, −1] refers to frames that include the fifth previous frame 320, second previous frame 321, and first previous frame 322 relative to the current frame. This in turn refers to the POC values of 0, 3, and 4, respectively as illustrated in FIG. 6 for the current frame with POC value of 5. Typically, the RPS refers to the difference in between the POC value of the current frame and the POC value of the previous frame. For example, the RPS of [−5, −2, −1] for a current frame having a POC value of 5, refers to frames having POC values of 5 minus 5=0; 5 minus 2=3; and 5 minus 1=4. The RPS can also include frames in the future. These may be indicated with positive values in the RPS (positive deltaPOC values).

Figure 7:
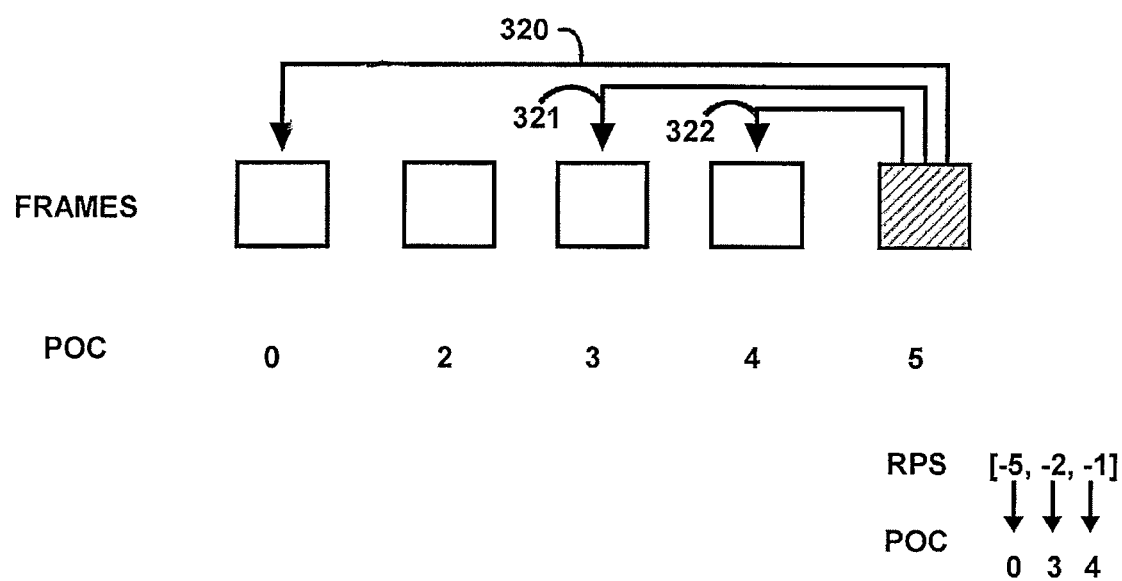
FIG. 7 illustrates reconstruction of an entropy slice with an omitted LSB count value.

In the case that the POC values are not sequential, such as in the case that one or more POC values are skipped or otherwise omitted in parts of the bitstream, the difference between the POC value of the current frame and POC value of the previous frame may be different than the number of frames output between the previous frame and current frame such as illustrated in FIG. 7. As shown in FIG. 7, the RPS of [−5, −2, −1] refers to frames that include the fifth previous frame 320, second previous frame 321, and first previous frame 322 relative to the POC of the frame identified with POC value equal to 5. The RPS may be signaled in the bitstream in any suitable manner, such as provided together with the frame or provided together with a set of frames.

Figure 8:
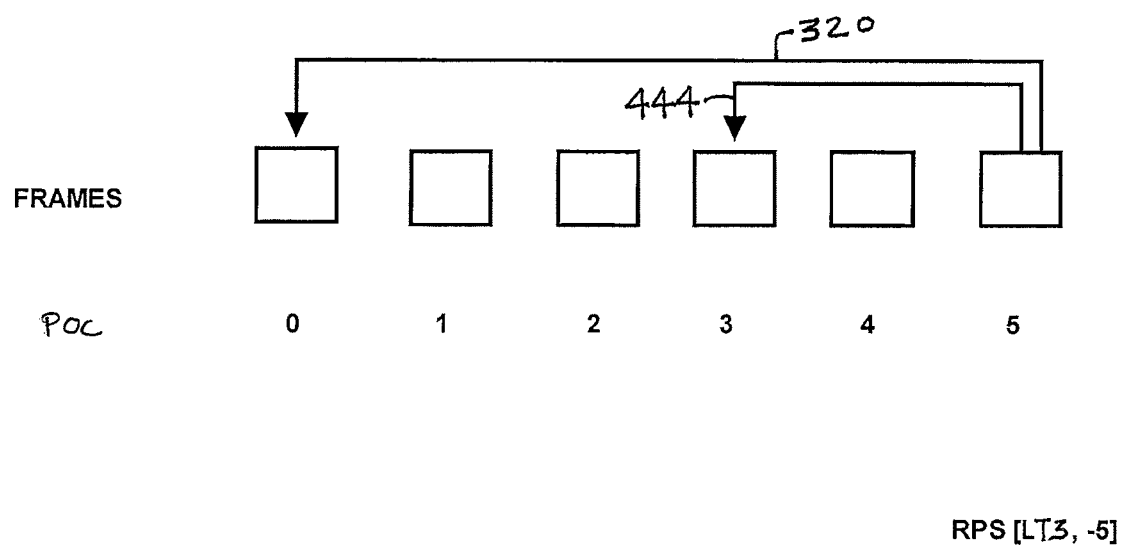
FIG. 8 illustrates reconstruction of an entropy slice with a long term picture value.

Referring to FIG. 8, another technique for signaling the reference frames is to use an absolute reference, generally referred to as a long term picture, in the RPS associated with a frame. The decoding process, such as the motion vector prediction technique, may be different depending if the reference frame is signaled using an absolute reference or a relative reference. The absolute reference (referred to as LT for convenience) refers to a particular LSB count value associated with a reference frame, such as a previous or subsequent frame. For example, the absolute reference of LT=3 (LT3) would refer to a reference frame having a POC LSB value of 3. Accordingly, a RPS of [LT3, −5] would refer to a reference frame having POC LSB value of 3 and a reference frame with a POC equal to the POC of the current frame minus 5. In FIG. 8, this corresponds to the reference frame with POC equal to 3 444 and the reference frame with POC equal to 0 320. Typically, the LT3 refers to the first previous frame relative to the current frame having a POC LSB value of 3. In one embodiment, LT3 refers to the first previous frame relative to the current frame in output order having a POC LSB value of 3. In a second embodiment, LT3 refers to the first previous frame relative to the current frame in transmission order having a POC LSB value of 3. While such a system is suitable for many bit streams, it is not sufficiently robust to select a frame with a LSB count value of 3 that is different than the immediately previous frame having a LSB count value of 3.

Figure 9:
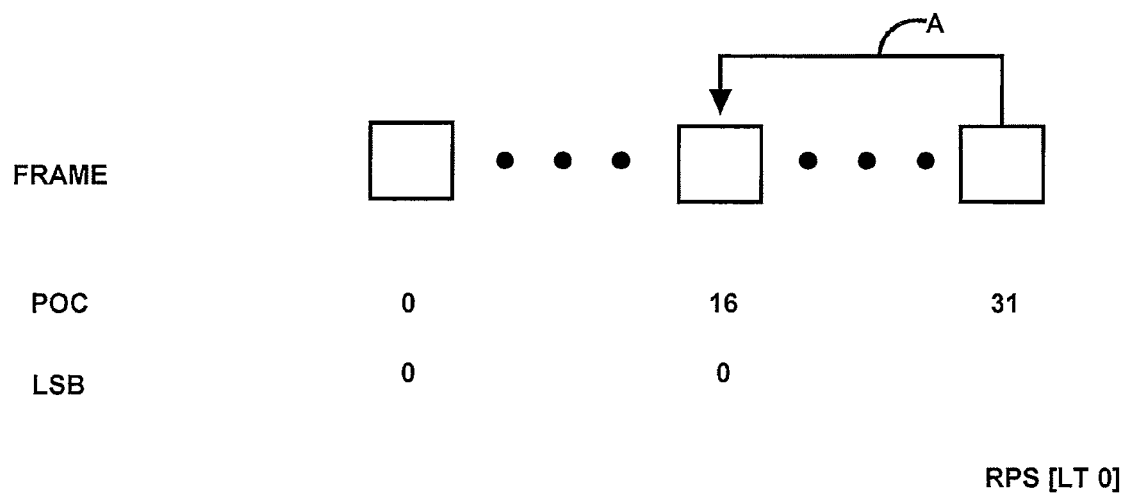
FIG. 9 illustrates reconstruction of an entropy slice by selecting a first preceding frame with a long term picture value.

Referring to FIG. 9, for example, if the encoder was encoding frame 31 (POC=31) and the system signals the use of the long term picture with POC LSB=0 (LT0), then this would refer A to frame 16 (POC=16) since it is the first previous frame with LSB=0. However, the encoder may desire to signal the long term picture frame 0, which likewise has a POC LSB count value of 0, but this may not be accomplished with such a first previous referencing scheme. To overcome this limitation, one technique is to increase the number of least significant bits used to signal the long term frame POC LSB. While such an increase in the number of least significant bits is possible, it results in substantial additional bits being added to the bitstream.

A more preferred technique that results in fewer additional bits being added to the bitstream is to signal a different long term picture than the first immediately preceding frame with a corresponding POC LSB value. For example, the system could indicate the RPS of the current frame having an absolute reference as [LT0|2] where the 0 refers to the POC LSB value and 2 refers to which of the previous frames with POC LSB value equal to 0 to use, which in this case would be the second previous POC LSB value of 0 (e.g., frame 0 in FIG. 9). If no second reference is included then the system may default to the immediately preceding frame with a POC LSB=0 [LT0] (e.g., frame 16 in FIG. 9).

In many cases, the frequency of occurrence of the desire to signal a frame that is not the first immediately preceding frame with the corresponding POC LSB value using absolute referencing will be relatively infrequent. To further reduce the overall bit rate indicating which frame to use, while permitting the capability of signaling a different frame than the first immediately preceding frame with the corresponding POC LSB value using absolute referencing, the system may use a duplication technique. For example, the RPS may be structured as follows, [LT0, LT0|3]. The duplication of the LT0 within the same RPS signals the decoder to use a different frame having a POC LSB value of 0, which in this case would be the third previous occurrence of the POC LSB value of 0. In general, aside from the potential that a particular POC LSB value would not be included in a particular cycle of POC LSB values, the desired POC LSB value will correspond to a frame of the indicated previous occurrence. Here, a cycle of POC LSB values denotes a set of frames that when ordered in output order do not contain the same POC LSB value and are not separated in output order by frames not in the set.

Figure 10:
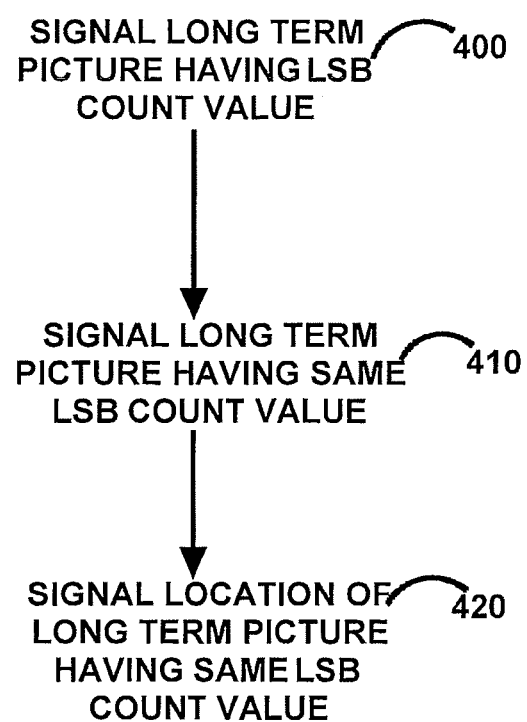
FIG. 10 illustrates reconstruction of an entropy slice by using duplicate long term picture frame having the same least significant bit count value.

Referring to FIG. 10, the duplication technique may be indicated as follows. The RPS includes a signal of a long term picture having a POC LSB value 400 (e.g., [LT3]). The same RPS includes another signal of a long term picture having the same POC LSB value 410 (e.g., [LT3, LT3]. The same RPS includes another signal of the second long term picture having the same LSB count value 410 indicating the location of the desired frame 420 [LT3, LT3|2].

Figure 11A:
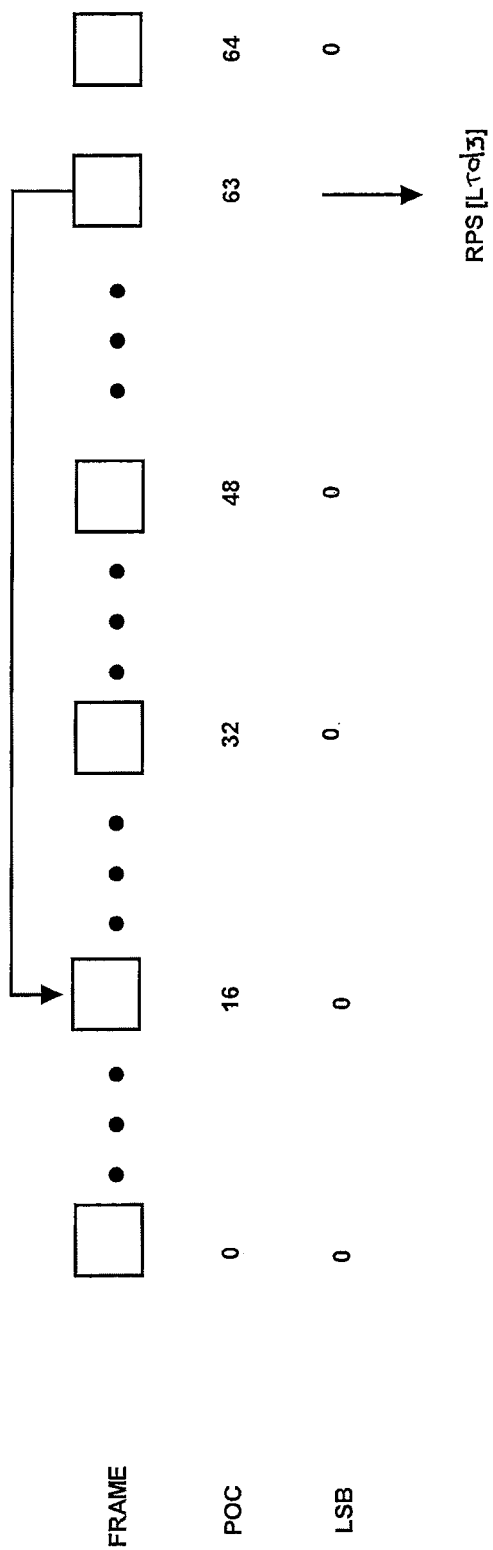
FIGS. 11A-11B illustrates a technique for selecting a reference frame.
Figure 11B:
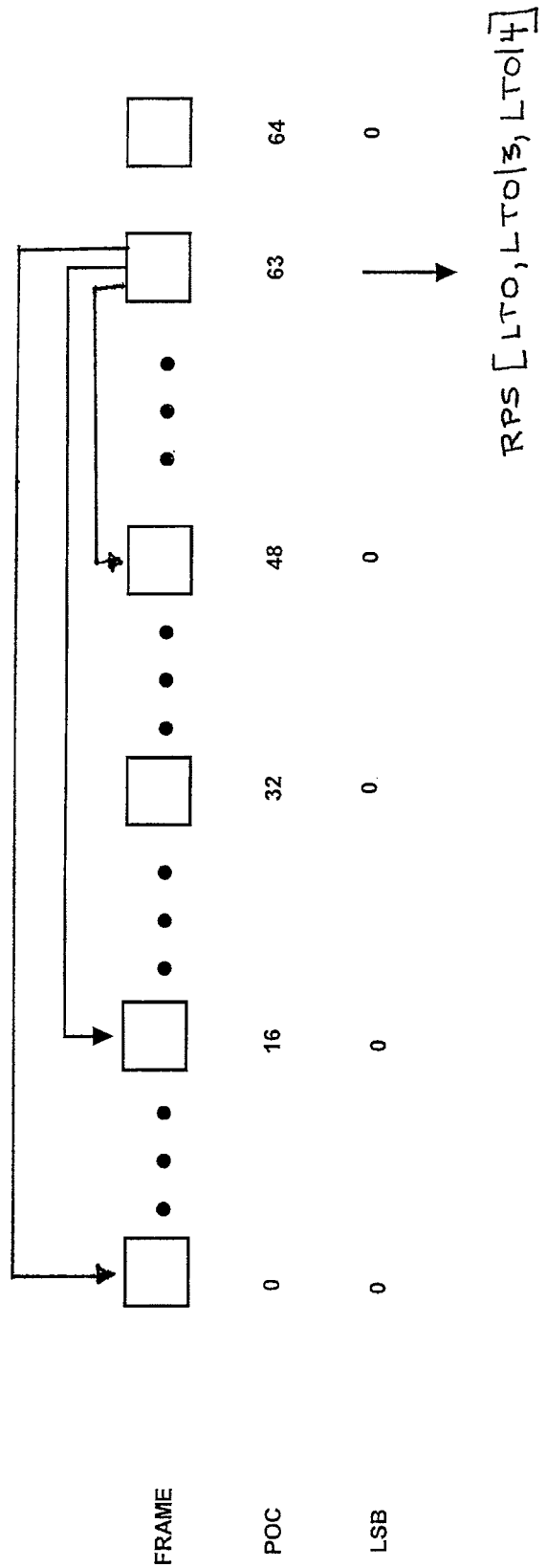
Figure 12:
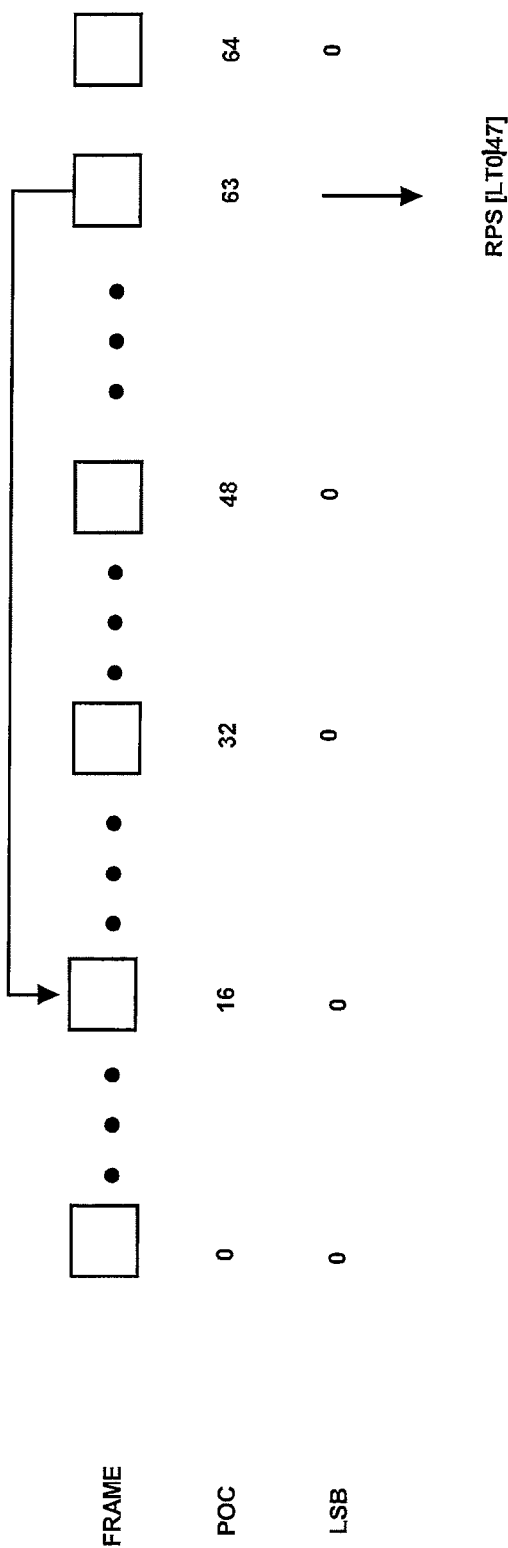
FIG. 12 illustrates another technique for selecting a reference frame.
Figure 13A:
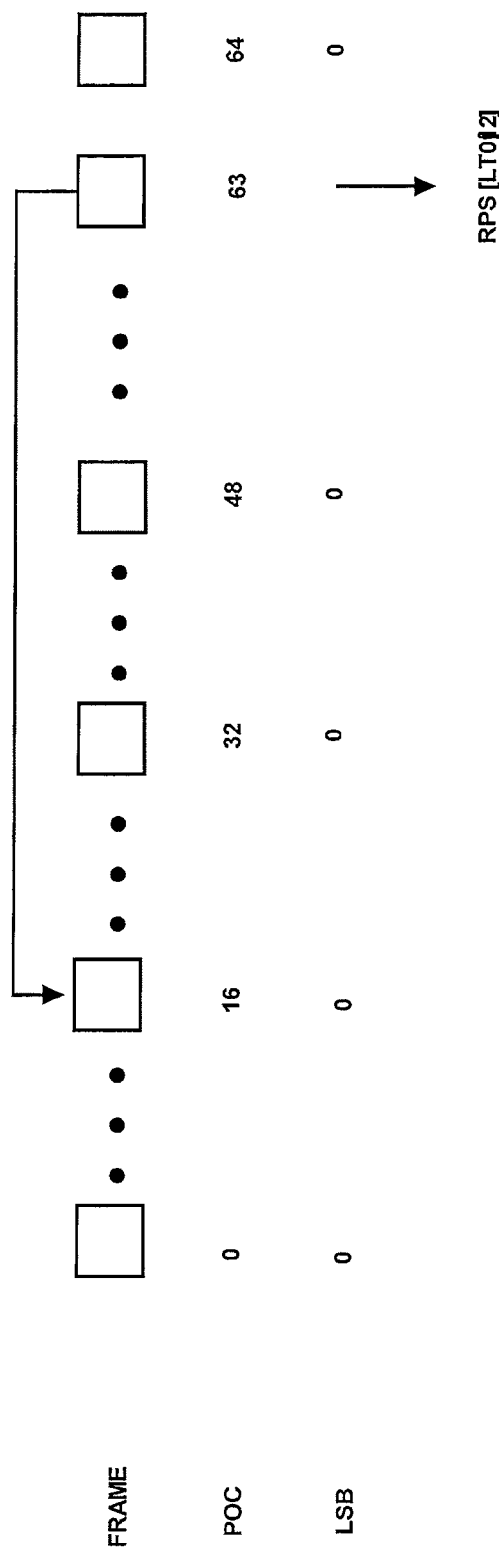
FIGS. 13A-13B illustrates another technique for selecting a reference frame.
Figure 13B:
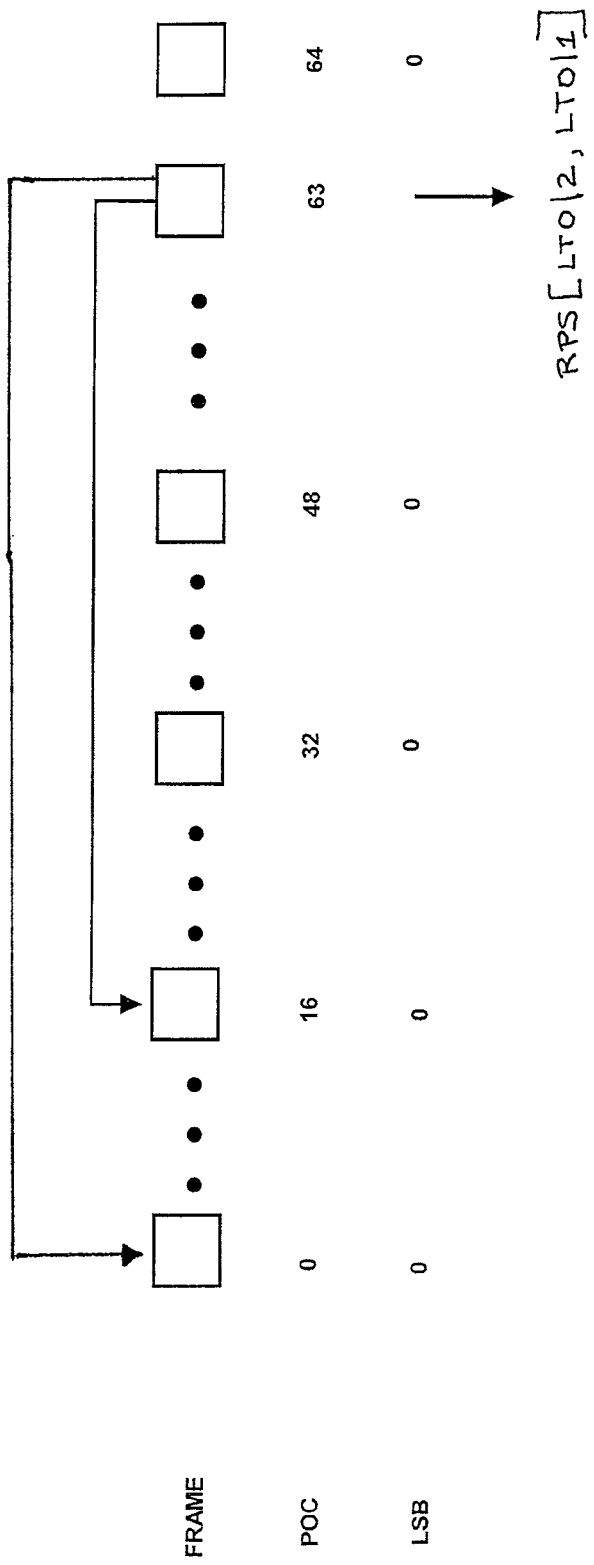
Figure 14:
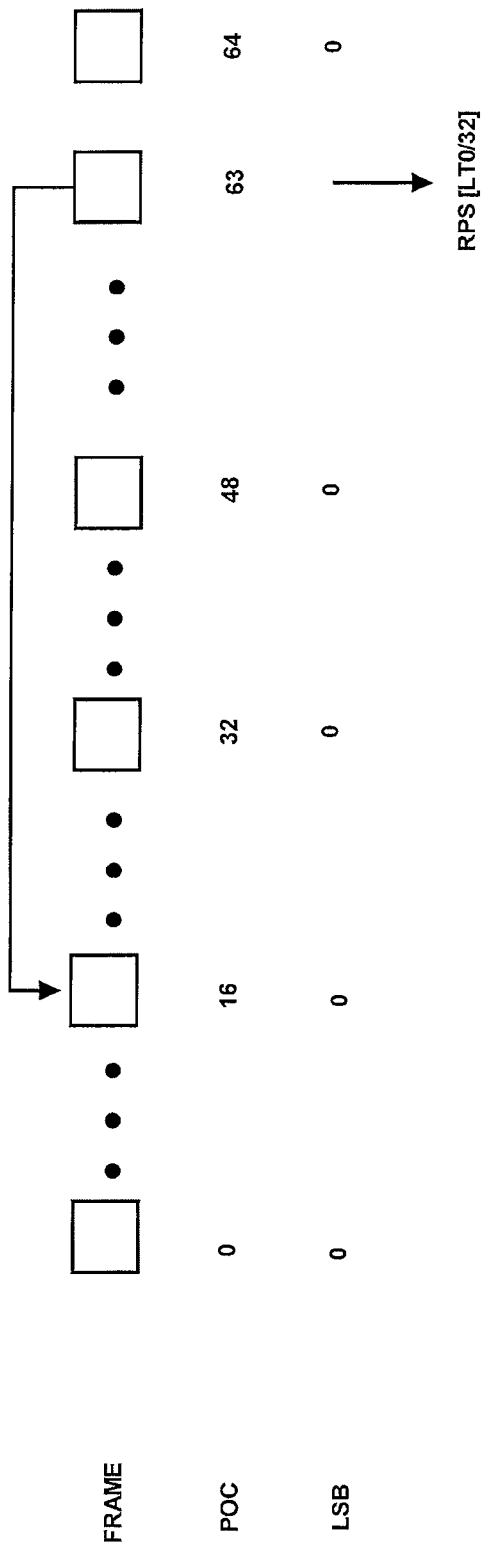
FIG. 14 illustrates another technique for selecting a reference frame.

The signaling of the location of the desired frame may be performed in any suitable manner. Referring to FIGS. 11A-11B for example, the location may be one or more previous cycles of the POC LSB values for the desired frame relative to the current frame, such as the third previous cycle. Referring to FIG. 12 for example, the location may be based upon an absolute number of frames offset from the current frame. Referring to FIGS. 13A-13B for example, the location may be one or more previous cycles of the POC LSB values relative to the first immediately preceding frame with the desired POC LSB value. Referring to FIG. 14 for example, the location may be based upon an absolute number of frames offset relative to the first immediately preceding frame with the desired POC LSB value.

One exemplary implementation of such a technique may use the following syntax.

| | Descriptor |
|---|---|
| slice_header( ) { | |
|   lightweight_slice_flag) | u(1) |
|   if( !lightweight_slice_flag ) { | |
|     slice_type | ue(v) |
|     pic_parameter_set_id | ue(v) |
|     if( IdrPicFlag ) { | |
|       idr_pic_id | ue(v) |
|       no_output_of_prior_pics_flag | u(1) |
|     } | |
|     else { | |
|       pic_order_cnt_lsb | u(v) |
|       short_term_ref_pic_set_pps_flag | u(1) |
|       if( !short_term_ref_pic_set_pps_flag ) | |
|         short_term_ref_pic_set( | |
|         num_short_term_ref_pic_sets ) | |
|       else | |
|         short_term_ref_pic_set_idx | u(v) |
|       if( long_term_ref_pics_present_flag ) { | |
|         num_long_term_pics | ue(v) |
|         for( i = 0; i < num_long_term_pics; i++ ) { | |
|           delta_poc_lsb_lt_minus1[ i ] | ue(v) |
|           if(deltaPOCLSBCheck(i)==1) { | |
|             delta_poc_msb_lt_minus1[ i ] | ue(v) |
|           } | |
|           used_by_curr_pic_lt_flag[ i ] | u(1) |
|         } | |
|       } | |
|     } | |
|     if( slice_type = = P | | slice_type = = B ) { | |
|       num_ref_idx_active_override_flag | u(1) |
|       if( num_ref_idx_active_override_flag ) { | |
|         num_ref_idx_l0_active_minus1 | ue(v) |
|         if( slice_type = = B ) | |
|           num_ref_idx_l1_active_minus1 | ue(v) |
|       } | |
|     } | |
| ... | |
| } | |

When the lightweight_slice_flag is equal to 1 specifies that the value of slice header syntax elements not present shall'be inferred to be equal to the value of slice header syntax elements in a proceeding slice, where a proceeding slice is defined as the slice containing treeblock with location (LCUAddress−1). The lightweight_slice_flag shall be equal to 0 when LCUAddress equal to 0. Here, a treeblock may be a macroblock and LCUAddress denotes the spatial location of the treeblock within a picture.

The slice_type specifies the coding type of the slice as follows:

When nal_unit_type is equal to 5 (IDR picture), slice_type shall be equal to 2. When max_num_ref frames is equal to 0, slice_type shall be equal to 2.

pic_parameter_set_id specifies the picture parameter set in use. The value of pic_parameter_set_id shall be in the range of 0 to 255, inclusive.

idr_pic_id identifies an IDR picture, which denotes a picture that does not use previously transmitted pictures for reference. The values of idr_pic_id in all the slices of an IDR picture shall remain unchanged. When two consecutive access units in decoding order are both IDR access units, the value of idr_pic_id in the slices of the first such IDR access unit shall differ from the idr_pic_id in the second such IDR access unit. The value of idr_pic_id shall be in the range of 0 to 65535, inclusive.

no_output_of_prior_pics_flag specifies how the previously-decoded pictures in the decoded picture buffer are treated after decoding of an IDR picture. When the IDR picture is the first IDR picture in the bitstream, the value of no_output_of_prior_pics_flag has no effect on the decoding process. When the IDR picture is not the first IDR picture in the bitstream and the value of pic_width_in_luma_samples or pic_height_in_luma_samples, which denote the dimensions of the pictures, or max_dec_frame_buffering, which denotes the maximum amount of reordering required at a decoder to convert a sequence of frames in transmission order to a sequence of frames in display order, derived from the active sequence parameter set is different from the value of pic_width_in_luma_samples or pic_height_in_luma_samples or max_dec_frame_buffering derived from the sequence parameter set active for the preceding picture, no_output_of_prior_pics_flag equal to 1 may (but should not) be inferred by the decoder, regardless of the actual value of no_output_of_prior_pics_flag.

pic_order_cnt_lsb specifies the picture order count modulo MaxPicOrderCntLsb for the current picture. The length of the pic_order_cnt_lsb syntax element is log 2_max_pic_order_cnt_lsb_minus4+4 bits. The value of the pic_order_cnt_lsb shall be in the range of 0 to MaxPicOrderCntLsb−1, inclusive. When pic_order_cnt_lsb is not present, pic_order_cnt_lsb shall be inferred to be equal to 0. Here, pic_order_cnt_lsb indicates the number of LSBs in POC LSB.

short_term_ref_pic_set_pps_flag equal to 1 specifies that the short-term reference picture set of the current picture shall be created using syntax elements in the active picture parameter set, which contains syntax elements that may be shared between multiple pictures. short_term_ref_pic_set_pps_flag equal to 0 specifies that the short-term reference picture set of the current picture shall be created using syntax elements in the short_term_ref_pic_set( ) syntax structure in the slice header. In some embodiments, a short-term reference picture set denotes a pictures set that only uses delta referencing.

short_term_ref_pic_set_idx specifies the index to the list of the short-term reference picture sets specified in the active picture parameter set that shall be used for creation of the reference picture set of the current picture. The syntax element short_term_ref_pic_set_idx shall be represented by ceil(log 2(num_short_term_ref_pic_sets)) bits. The value of short term ref_pic_set_idx shall be in the range of 0 to num_short_term_ref_pic_sets−1, inclusive, where num_short_term_ref_pic_sets is the syntax element from the active picture parameter set.

The variable StRpsIdx is derived as follows.

```
If( short_term_ref_pic_set_pps_flag )
    StRpsIdx = short_term_ref_pic_set_idx
Else
    StRpsIdx = num_short_term_ref_pic_sets
``` num_long_term_pics specifies the number of the long-term reference pictures that are to be included in the long-term reference picture set of the current picture. The value of num_long_term_pics shall be in the range of 0 to max_num_ref_frames−NumNegativePics[StRpsIdx]−NumPositivePics[StRpsIdx], inclusive. When not present, the value of num_long_term_pics shall be inferred to be equal to 0. In some embodiments, the long-term reference pictures denote reference pictures that are transmitted with absolute referencing.

delta_poc_lsb_lt_minus1[i] is used to determine the value of the least significant bits of the picture order count value of the i-th long-term reference picture that is included in the long-term reference picture set of the current picture. delta_poc_lsb_lt_minus1[i] shall be in the range of 0 to MaxPicOrderCntLsb−1, inclusive. In some embodiments, delta_poc_lsb_lt_minus1[i] denotes POC LSB of the i-th long-term reference picture.

The variable DeltaPocLt[i] is derived as follows.

```
If (i= = 0)
    DeltaPocLt[i] = delta_poc_lsb_lt_minus1[i] + 1
Else
    DeltaPocLt[i] = delta_poc_lsb_lt_minus1[i] + 1 + DeltaPocLt[i−1]
```

The value of DeltaPocLt[i] shall be int the range of 0 to MaxPicOrderCntLsb, inclusive.

deltaPOCLSBCheck(i) is a function as follows:

```
deltaPOCLSBCheck(int i)
{
for(m=0;m<i;m++)
{
    if(delta_poc_lsb_lt_minus1[i]=delta_poc_lsb_lt_minus1[ml])
    {
      return 1;
    }
}
Return 0
}
``` delta_poc_msb_lt_minus1[i] is together with delta_poc_lsb_lt_minus1[i] used to determine the value of picture order count of the i-th long term reference picture that is included in the long-term reference picture set of the current reference picture.

The variable delta_poc_msb_lt_minus1[i] is derived as follows:

```
for(n=0;n<i;n++)
{
    deltaNumSameLSBs=0;
    if(delta_poc_lsb_lt_minus1[i]==delta_poc_lsb_lt_minus1[n])
    {
      if(deltaNumSameLSBs=0)
      {
        delta_poc_msb_lt_minus1[i]=PicOrderCntMsb[i]−1;
        deltaNumSameLSBs++;
      }
      else
      {
        delta_poc_msb_lt_minus[i]=PicOrderCntMsb[i]−delta_poc_msb_lt_minus1[n−1];
      }
    }
}
```

In an alternative embodiment instead of sending element delta_poc_msb_lt_minus1 when the delta_poc_lsb_lt_minus1 values are same, a poc_msb_lt_minus1 or poc_msb_lt element may be sent. Here poc_msb_lt_minus1 indicates POC value of the reference picture −1. This may be absolute POC value. Similarly poc_msb_lt indicates POC value of reference picture. Again this may be absolute POC value.

used_by_curr_pic_lt_flag[i] equal to 0 specifies that the i-th long-term reference picture included in the long-term reference picture set of the current picture is not used for reference, or inter-frame prediction, by the current picture.

num_ref_idx_active_override_flag equal to 1 specifies that the syntax element num_ref_idx_l0_active_minus1 is present for P and B slices and that the syntax element num_ref_idx_l1_active_minus1 is present for B slices. num_ref_idx_active_override_flag equal to 0 specifies that the syntax elements num_ref_idx_l0_active_minus1 and num_ref_idx_l1_active_minus1 are not present.

When the current slice is a P or B slice and field_pic_flag is equal to 0 and the value of num_ref_idx_l0_default_active_minus1 in the picture parameter set exceeds 15, num_ref_idx_active_override_flag shall be equal to 1.

When the current slice is a B slice and field_pic_flag is equal to 0 and the value of num_ref_idx_l1_default_active_minus1 in the picture parameter set exceeds 15, num_ref_idx_active_override_flag shall be equal to 1.

num_ref_idx_l0_active_minus1 specifies the maximum reference index for reference picture list 0 that shall be used to decode the slice.

When the current slice is a P or B slice and num_ref_idx_l0_active_minus1 is not present, num_ref idx_l0_active_minus1 shall be inferred to be equal to num_ref_idx_l0_default_active_minus1.

The range of num_ref_idx_l0_active_minus1 is specified as follows:

If field_pic_flag is equal to 0, num_ref_idx_l0_active_minus1 shall be in the range of 0 to 15, inclusive. When MbaffFrameFlag is equal to 1, num_ref_idx_l0_active_minus1 is the maximum index value for the decoding of frame macroblocks and 2*num_ref_idx_l0_active_minus1+1 is the maximum index value for the decoding of field macroblocks.

Otherwise (field_pic_flag is equal to 1), num_ref_idx_l0_active_minus1 shall be in the range of 0 to 31, inclusive.

num_ref_idx_l1_active_minus1 specifies the maximum reference index for reference picture list 1 that shall be used to decode the slice.

When the current slice is a B slice and num_ref_idx_l1_active_minus1 is not present, num_ref_idx_l1_active_minus1 shall be inferred to be equal to num_ref_idx_l1_default_active_minus 1.

The range of num_ref_idx_l1_active_minus1 is constrained as specified in the semantics for num_ref_idx_l0_active_minus1 with l0 and list 0 replaced by l1 and list 1, respectively.

The operation deltaPOCLSBCheck(int i) determines the same POC LSB is transmitted from the encoder to the decoder using absolute referencing for the current frame. In an alternative embodiment, determining if the same POC LSB is transmitted can be accomplished by checking if the value delta_poc_lsh_lt_minus1 is equal to a value known to both the encoder and decoder. For example, delta_poc_lsb_lt_minus1 equal to 0 could denote the POC LSB is the same as the previously transmitted POC LSB. Alternatively, delta_poc_lsb_lt_minus1 equal to 2 N–1, where N denotes the number of bits used to transmit POC LSB and known to the both the encoder and decoder, 0 could denote the POC LSB is the same as the previously transmitted POC LSB. In alternative embodiments, the value delta_poc_lsb_lt_minus1 is replaced with the syntax element delta_poc_lsb_lt, which is generally equal to delta_pos_lsb_lt_minus1 plus 1. In these embodiments, the delta_poc_lsb_lt equal to a value known to both the encoder and decoder can indicate the picture transmitted using absolute referencing has the same POC LSB as the previous picture transmitted using absolute referencing in the same RPS. For example, delta_poc_lsb_lt equal to 0 could denote the POC LSB is the same as the previously transmitted POC LSB. Alternatively, delta_poc_lsb_lt equal to 2 N, where N denotes the number of bits used to transmit POC LSB and known to the both the encoder and decoder, 0 could denote the POC LSB is the same as the previously transmitted POC LSB.

For long term reference picture set the decoding process may be done as follows:

```
for( i = 0, j = 0, k = 0; i < num_long_term_pics; i++ ) {
  PocMSB=0;
  if(deltaPOCLSBCheck(i)==0)
  {
    for(n=0;n<i;n++)
    {
      PocMSB=0; deltaNumSameLSBs=0;
      if(delta_poc_lsb_lt_minus1[i]==delta_poc_lsb_lt_minus1[n])
      {
        if(deltaNumSameLSB==0)
        {
          PocMSB =delta_poc_msb_lt_minus1[i];
          deltaNumSameLSBs++;
        }
        else
        {
          PocMSB +=delta_poc_msb_lt_minus1[n];
        }
      }
    }
  }
  if( used_by_curr_pic_lt_flag[ i ] )
      PocLtCurr[ j++ ] = PocMSB+(( PicOrderCntVal − DeltaPocLt[ i ]
  + MaxPicOrderCntLsb ) %
      MaxPicOrderCntLsb)
  else
      PocLtFoll[ k++ ] = PocMSB+(( PicOrderCntVal − DeltaPocLt[ i ]
  + MaxPicOrderCntLsb ) %
      MaxPicOrderCntLsb)
}
```

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of encoding a picture, the method comprising:
    encoding, in a slice header, a least significant bits (LSB) value of a picture order count (POC) of a reference picture in a reference picture set;
    determining to encode a most significant bits (MSB) value of the POC;
    based on the determining, encoding in the slice header the MSB value of the POC and a separate indication that the MSB value of the POC is present in a video bitstream, wherein the MSB value is encoded in the slice header after the LSB value; and
    transmitting the slice header via the video bitstream.

2. The method of claim 1, further comprising:
    encoding the current picture by using inter prediction based on the reference picture set.

3. The method of claim 1, further comprising:
    storing the reference picture in a picture buffer; and
    referring to the stored reference picture for inter prediction corresponding to a subsequent picture.

4. The method of claim 1, wherein the LSB value has a size of 4 bits.

5. The method of claim 1, further comprising:
    encoding a value indicating a size of the LSB value, wherein the value is specified as a number of bits.

6. The method of claim 1, wherein the video bitstream is transmitted to a decoder.

7. An encoder device comprising:
processing hardware configured to perform operations comprising:
- encoding, in a slice header, a least significant bits (LSB) value of a picture order count (POC) of a reference picture in a reference picture set;
- determining to encode a most significant bits (MSB) value of the POC;
- based on the determining, encoding in the slice header the MSB value of the POC and a separate indication that the MSB value of the POC is present in a video bitstream, wherein the MSB value is encoded in the slice header after the LSB value; and
- transmitting the slice header via the video bitstream.

8. The encoder device of claim 7, the operations further comprising:
encoding the current picture by using inter prediction based on the reference picture set.

9. The encoder device of claim 7, the operations further comprising:
storing the reference picture in a picture buffer; and
referring to the stored reference picture for inter prediction corresponding to a subsequent picture.

10. The encoder device of claim 7, wherein the LSB value has a size of 4 bits.

11. The encoder device of claim 7, the operations further comprising:
encoding a value indicating a size of the LSB value, wherein the value is specified as a number of bits.

12. The encoder device of claim 7, wherein the video bitstream is transmitted to a decoder.

13. A non-transitory computer-readable medium storing instructions, which when executed, cause processing hardware to perform operations comprising:
- encoding, in a slice header, a least significant bits (LSB) value of a picture order count (POC) of a reference picture in a reference picture set;
- determining to encode a most significant bits (MSB) value of the POC;
- based on the determining, encoding in the slice header the MSB value of the POC and a separate indication that the MSB value of the POC is present in a video bitstream, wherein the MSB value is encoded in the slice header after the LSB value; and
- transmitting the slice header via the video bitstream.

14. The non-transitory computer-readable medium of claim 13, the operations further comprising:
encoding the current picture by using inter prediction based on the reference picture set.

15. The non-transitory computer-readable medium of claim 13, the operations further comprising:
storing the reference picture in a picture buffer; and
referring to the stored reference picture for inter prediction corresponding to a subsequent picture.

16. The non-transitory computer-readable medium of claim 13, wherein the LSB value has a size of 4 bits.

17. The non-transitory computer-readable medium of claim 13, the operations further comprising:
encoding a value indicating a size of the LSB value, wherein the value is specified as a number of bits.

* * * * *